(12) United States Patent
Krytenberg et al.

(10) Patent No.: US 11,174,391 B2
(45) Date of Patent: Nov. 16, 2021

(54) COMPOSITION FOR EFFECTING ARTIFICIAL FROST ON GLASS

(71) Applicants: Timothy Krytenberg, Vancouver, WA (US); Abram Scurlock, Vancouver, MI (US)

(72) Inventors: Timothy Krytenberg, Vancouver, WA (US); Abram Scurlock, Vancouver, MI (US)

(*) Notice: Subject to any disclaimer, the term of this patent is extended or adjusted under 35 U.S.C. 154(b) by 484 days.

(21) Appl. No.: 15/668,749

(22) Filed: Aug. 4, 2017

(65) Prior Publication Data

US 2019/0040265 A1 Feb. 7, 2019

(51) Int. Cl.

| | |
|---|---|
| *C09D 1/00* | (2006.01) |
| *C09D 1/02* | (2006.01) |
| *C03C 17/22* | (2006.01) |
| *C09D 7/43* | (2018.01) |
| *C09D 7/61* | (2018.01) |
| *C09D 7/40* | (2018.01) |
| *C03C 17/00* | (2006.01) |
| *C08K 3/34* | (2006.01) |
| *C08K 7/18* | (2006.01) |
| *C08K 3/26* | (2006.01) |

(52) U.S. Cl.
CPC .............. *C09D 1/02* (2013.01); *C03C 17/007* (2013.01); *C03C 17/22* (2013.01); *C09D 7/43* (2018.01); *C09D 7/61* (2018.01); *C09D 7/70* (2018.01); *C03C 2217/45* (2013.01); *C03C 2217/475* (2013.01); *C03C 2218/11* (2013.01); *C08K 3/34* (2013.01); *C08K 7/18* (2013.01); *C08K 2003/262* (2013.01)

(58) Field of Classification Search
None
See application file for complete search history.

(56) References Cited

U.S. PATENT DOCUMENTS

| | | | | |
|---|---|---|---|---|
| 3,565,675 A | * | 2/1971 | Sams | ..................... C03C 17/22 427/353 |
| 5,518,535 A | * | 5/1996 | Boaz | ........................ C03C 8/14 106/38.3 |
| 2002/0061940 A1 | * | 5/2002 | Lach | ..................... C08F 220/18 523/160 |
| 2013/0017388 A1 | * | 1/2013 | Boguslavsky | ............ C03C 8/14 428/312.6 |

FOREIGN PATENT DOCUMENTS

| | | | | |
|---|---|---|---|---|
| WO | WO-2016106611 A1 | * | 7/2016 | ........ B01J 20/28071 |
| WO | WO-2016181676 A1 | * | 11/2016 | ............... B05D 7/24 |

OTHER PUBLICATIONS

WO-2016181676-A1—English translation (Year: 2016).*

* cited by examiner

*Primary Examiner* — Stefanie J Cohen

(57) ABSTRACT

A coating for effecting artificial frost on glass, the coating comprising a silicate, a material selected from the group consisting of ceramic and glass spheres, sodium aluminosilicate, a lithium compound, and, a thickener.

22 Claims, No Drawings

COMPOSITION FOR EFFECTING ARTIFICIAL FROST ON GLASS

BACKGROUND OF THE INVENTION

Generally, frosted glass is produced by sandblasting or acid etching of clear sheet glass. Preferred for acid etching is hydrofluoric acid. It has the effect of rendering the glass translucent by scattering the light during transmission, thus, blurring images, while at the same time still transmitting a portion of light.

Frosted glass is desired for many reasons, for example, privacy, such as frosted glass in a restroom, for decorative patterns, for treating glass light bulbs to cut down on glare, for distributing light uniformly in photography, and in some instances, creating airtight seals in glass chemical equipment.

Some frosted glass effects can be achieved by the application of vinyl film, used as a sort of stencil on the glass surface. Photo-resist, or photo-resistant film is also available, which can be used to mask off the area surrounding a decorative design, or logo, on a glass surface. A similar effect may also be accomplished with the use of canned frosted glass sprays.

The inventors herein are not aware of any publications defining a coating for achieving the same effect as the coating of the instant invention.

THE INVENTION

Thus, what is claimed herein is a coating for effecting artificial frost on glass, the coating comprising a silicate; a material selected from the group consisting of ceramic and glass spheres; sodium aluminosilicate; a lithium compound, and, a thickener.

In another embodiment, there is a coating for effecting artificial frost on glass, the coating comprising 1 to 80 weight percent water; 15 to 25 weight percent of ceramic or glass spheres; 3 to 20 weight percent of sodium aluminosilicate; 3 to 15 weight percent of a lithium compound, and, 1 to 10 weight percent of a thickener, all based on the total weight of the components.

In addition, there is a method of manufacturing a composition as Set forth above, the method comprising blending a. predetermined amount of water, thickener, and lithium compound using nigh shear to obtain a uniform dispersion and thereafter, slowly adding, using high shear, a stabilizer, sodium aluminosilicate, a flux agent, kaolin clay, boron nitride, and ceramic or glass spheres; thereafter, adding the silicate and grinding the mixture using a mill until a uniform dispersion is obtained.

There is further another embodiment, which is a method of creating artificially frosted glass, the method comprises treating a glass substrate with the composition as set forth Supra and heating the treated glass at a temperature in the range of about 600 to 700° C. for a time of about 5 to 15 minutes to cure the composition.

Also contemplated within the scope of this invention is a glass article that has been treated using the methods set forth Supra.

DETAILED DESCRIPTION OF THE INVENTION

The instant invention comprises a basic composition which is comprised of a silicate, ceramic or glass spheres such as alkali alumino silicate ceramic spheres having diameters ranging from 9 to 40 nm, glass spheres both hollow and solid with diameters ranging from 9 to 40 nm, sodium aluminosilicate, a lithium compound, such as lithium carbonate and lithium chloride, and a thickener. The invention contemplates providing this composition in water as a carrier wherein the water has a stabilizer contained in it.

Such stabilizers for purposes of this invention can be, for example, sodium hydroxide, potassium hydroxide and lithium hydroxide, and the like.

Also contemplated within the scope of this invention is the composition described just Supra and in addition, there is present a flux agent, kaolin clay, and boron nitride.

Flux agents useful in this invention can be, for example, compounds of phosphate, such as for example sodium tripolyphosphate and sodium phosphate dibasic, and boron compounds such as sodium borate (Borax), and barium compounds.

Thickeners useful in this invention can be, for example, hectorite, bentonite, smectite clay, and fumed aluminum oxide, Silicates found useful in this invention comprise sodium silicate, potassium silicate and lithium silicate.

The method of manufacturing the compositions of this invention comprises blending a predetermined amount of water, thickener, and a lithium compound using high shear (sand, ball, or basket mill) to obtain a uniform dispersion. Thereafter, one slowly adds, using high shear, a stabilizer, sodium aluminosilicate, a flux agent, kaolin clay, boron nitride, and ceramic or glass spheres and then adding a silicate of choice and grinding (sand, ball, or basket mill) the mixture until a uniform dispersion is obtained. It is contemplated within the scope of this invention to filter the mixture after the last step.

The composition obtained by the method set forth just Supra is then used to treat glass. For example, the method comprises treating a glass substrate by coating it with the composition and then heating the treated, coated glass at a temperature in the range of about 600 to 700° C. for a time of about 5 to 15 minutes to cure the composition. Thus, it is contemplated within the scope of this invention to provide treated frosted glass articles.

EXAMPLES

A silicate coating of this invention gives a frosted effect on glass upon curing. The coating can be applied via spray, roll coat, dipping, or screen print. It is applied prior to tempering, and cured when the glass is sent through a tempering furnace. On the other hand, the coating can be applied to tempered glass and an equivalent temperature can be applied to cure.

Components in these examples were obtained from the following: Bentone MA from Elementis Caroline House, 55-57 High Holborn, London WC1V 6DX, UK; Zeolex 23D from Buber Engineering Materials, County road 875, Etowah, Tenn. 37331; W-210 Zeospheres from 3M Advanced Materials Division, 12A St. #201-ls, Saint Paul, Minn. 55144; Burgess 10 from Burgess Pigment Company 167 Pierce Avenue, Macon, Ga. 31204; boron Nitride from Momentive; BW-5Q Sodium Silicate from PQ Corporation, 300 Lindenwood Drive, Valleybrooke Corporate Center, Malvern, Pa. 19355-1740.

All Percentages are by weight based on the weight of the total composition.

The general procedure for the following examples was blending the water, Bentone and lithium carbonate under high shear to ensure the complete dispersal. Preferably the material is ground using grinding media, such as, zirconate or glass grinding media, in a basket mail or ball mill, but this is not required and any form, of dispersing powders can be used. The remaining ingredients are slowly added under shear in any order desired. The preferred order is potassium hydroxide, Zeolex 23D, sodium tripolyphosphate, Burgess 10, boron nitride and W-210 zeospheres, with the silicate last. Preferably the material is then ground using grinding media such as zirconate or glass grinding media in a basket mill or ball mill, but other forms of dispersing the powders can be used. The materials of these examples can be filtered if desired.

Example 1

This example combined 65.8% water 1.48% Bentone MA 3.56% lithium carbonate; 0.30% potassium hydroxide 1.48% Zeolex 23D; 0.58% sodium tripolyphosphate; 3.56% W-210 Zeospheres and 23.74% BW-50 sodium silicate. This formulation, when heat cured, at 700° C. for 10 minutes, gave a light density spray frost on glass.

Example 2

This example combined 68.43% water; 1.87% Bentone MA; 3.73% Lithium carbonate; 0.31% Boras; 0.31% potassium hydroxide; 0.16% Burgess 10, 1.56% Zeolex 23D; 6.84% W-210 Zeospheres and 16.80% BM-50 Sodium silicate. This formulation when heat cured at 700° C. for 10 minutes, gave a medium density roll coat frost on glass.

Example 3

This example combined 55.56% water; 1.54% Bentone MA; 3.08% lithium carbonate; 0.26% potassium hydroxide; 1.29% Zeolex 23D; 0.51% sodium tripolyphosphate; 15.42% W-210 Zeospheres; 0.51% Burgess 10; 0.26% Boron nitride powder, and 20.57% Lithisil 829, and 1,00% Borax. This formulation when heat cured at 700° C. for 6 minutes, gave a heavy density screen print frost.

What is claimed is:

1. A coating for effecting artificial frost on glass, said coating comprising:
   a. a silicate;
   b. ceramic or glass spheres;
   c. sodium aluminosilicate;
   d. a lithium compound, and,
   e. a thickener.

2. A coating as claimed in claim 1 wherein, in addition, there is present water.

3. A coating as claimed in claim 1 wherein, in addition, there is present a stabilizer.

4. A coating as claimed in claim 1 wherein, in addition, there is present a flux agent.

5. A coating as claimed in claim 1 wherein, in addition, there is present kaolin clay.

6. A coating as claimed in claim 1 wherein, in addition, there is present boron nitride.

7. A coating for effecting artificial frost on glass, said coating comprising:
   i. 1 to 80 weight: percent, water;
   ii. 15 to 25 weight percent of ceramic or glass spheres;
   iii. 3 to 20 weight percent of sodium aluminosilicate;
   iv. 3 to 15 weight percent of a lithium compound, and,
   v. 1 to 10 weight percent of a thickener, all based on the total weight of x. to v.

8. A coating composition as claimed in claim 7 wherein, in addition, there is present one or more of the group consisting of a stabilizer, flux agents, kaolin clay, and boron nitride.

9. A coating composition as claimed in claim 8 wherein said thickener is selected from the group consisting of hectorite, bentonite and smectite clay, and fumed aluminum oxide.

10. A coating composition as claimed in claim 8 wherein said stabilizer is selected from the group consisting of sodium hydroxide, potassium hydroxide and lithium hydroxide.

11. A coating composition as claimed in claim 8 wherein said additional flux agents are selected from the group consisting of compounds of phosphate and compounds of borates.

12. A coating composition as claimed in claim 8 wherein said additional flux agent is selected from compounds of boron.

13. A coating composition as claimed in claim 11 wherein said phosphate compound is selected from the group consisting of sodium tripolyphosphate and sodium, phosphate dibasic.

14. A coating composition as claimed in claim 1 wherein said silicate is selected from the group consisting of sodium silicate, potassium silicate and lithium silicate.

15. A method of manufacturing a composition as claimed in claim 8, said method comprising:
   a. blending a predetermined amount of water, thickener, and lithium compound using high shear to obtain a uniform dispersion;
   b. thereafter, slowly adding, using high shear, a stabilizer, sodium aluminosilicate, a flux agent, kaolin clay, boron nitride, and ceramic or glass spheres;
   c. thereafter, adding said silicate and grinding said mixture using a mill until a uniform dispersion is obtained.

16. The method as claimed in claim 15 wherein, in addition, the mixture, after step c. is filtered.

17. The method as claimed in claim 15 wherein the high shear is grinding and the method is selected from, the group consisting of sand milling, ball milling and basket milling.

18. A method of creating artificially frosted glass, said method comprising:
   A. treating a glass substrate with the composition of claim 8;
   B. heating said, treated glass at a temperature in the range of about 600 to 700° C. for a time of about 5 to 15 minutes to cure said composition.

19. A glass article that has been treated using the method of claim 18.

20. A composition of matter having the formulation:
   a. 63 to 67 weight percent of water;
   b. 1.40 to 1.50 weight percent of thickener;
   c. 3.50 to 3.75 weight percent of lithium carbonate;
   d. 0.25 to 0.35 weight percent KOH;
   e. 1.40 to 1.60 weight percent of sodium aluminosilicate;
   f. 0.5 to 0.65 weight percent sodium tripolyphosphate;
   g. 3.50 to 4.0 weight percent of ceramic spheres, and,
   h. 20.0 to 25.0 weight percent of sodium silicate, all based on the total weight of a. to h.

21. A composition of matter having the formulation;
   a. 60.0 to 65.0 weight percent of water;
   b. 3.00 to 4.00 weight percent of thickener;
   c. 3.00 to 4.00 weight percent of lithium carbonate;
   d. 0.25 to 0.30 weight percent of KOH;
   e. 1.35 to 1.50 weight percent of sodium aluminosilicate;
   f. 6.00 to 6.50 weight percent of ceramic spheres, and, g. 20.0 to 25.0 weight percent of sodium silicate, all based on the total weight of a. to g.

22. A composition of matter having the formulation;
a. 50.0 to 50.0 weight percent water;
b. 1.40 to 1.60 weight percent of thickener;
c. 3.00 to 3.25 weight percent of lithium carbonate;
d. 0.20 to 0.30 weight percent of KOH;
e. 1.00 to 1.50 weight percent of sodium aluminosilicate;
f. 0.40 to 0.60 weight percent of sodium tripolyphosphate;
g. 15.0 to 1.6 weight percent of ceramic spheres;
h. 0.40 to 0.60 weight percent of kaolin clay;
i. 0.20 to 0.30 weight percent of boron nitride powder, and,
j. 18.00 to 22.0 weight percent of lithium silicate, all based on the total weight of a. to j.

* * * * *